United States Patent
Lee et al.

(10) Patent No.: US 9,886,427 B2
(45) Date of Patent: Feb. 6, 2018

(54) SUGGESTING RELEVANT TERMS DURING TEXT ENTRY

(75) Inventors: Michael Chun-Chieh Lee, Bronx, NY (US); Eric Cohen-Solal, Ossining, NY (US); Yuechen Qian, Briarcliff Mano, NY (US)

(73) Assignee: Koninklijke Philips N.V., Eindhoven (NL)

( * ) Notice: Subject to any disclaimer, the term of this patent is extended or adjusted under 35 U.S.C. 154(b) by 419 days.

(21) Appl. No.: 13/882,219

(22) PCT Filed: Oct. 31, 2011

(86) PCT No.: PCT/IB2011/054826
§ 371 (c)(1),
(2), (4) Date: Apr. 29, 2013

(87) PCT Pub. No.: WO2012/059854
PCT Pub. Date: May 10, 2012

(65) Prior Publication Data
US 2013/0212475 A1 Aug. 15, 2013

Related U.S. Application Data

(60) Provisional application No. 61/408,699, filed on Nov. 1, 2010.

(51) Int. Cl.
*G06F 17/00* (2006.01)
*G06F 17/24* (2006.01)
*G06F 17/27* (2006.01)

(52) U.S. Cl.
CPC ........... *G06F 17/24* (2013.01); *G06F 17/276* (2013.01); *G06F 17/277* (2013.01)

(58) Field of Classification Search
CPC ...... G06F 17/24; G06F 17/276; G06F 3/0237; G06F 17/277; G06F 17/2765;
(Continued)

(56) References Cited

U.S. PATENT DOCUMENTS

| 6,377,965 B1 * | 4/2002 | Hachamovitch et al. .... 715/203 |
| 7,343,551 B1 * | 3/2008 | Bourdev ............... G06F 17/243 715/224 |
| 7,890,521 B1 * | 2/2011 | Grushetskyy ..... G06F 17/30867 704/10 |

(Continued)

FOREIGN PATENT DOCUMENTS

| JP | 2007034871 A | 2/2007 |
| KR | 2007109207 A | 11/2007 |
| WO | 2006078912 A2 | 7/2006 |

OTHER PUBLICATIONS

Hyvonen, E. et al. "Semantic autocompletion". Proceedings of the first Asia Semantic Web Conference (ASWC 2006) Beijing, Springer-Verlag, NY Aug. 4-9, 2006.
(Continued)

*Primary Examiner* — Scott Baderman
*Assistant Examiner* — Jason Edwards

(57) ABSTRACT

A system for suggesting autocompletion terms during text entry of a report. A text entry unit (2) for enabling a user to enter a text into a current report (1). A term selector (11) for selecting at least one frequently co-occurring term (12), based on an extracted term (8), the extracted term section (9), the current section (10), and a co-occurrence statistic (7). An indicator (13) provides an indication of the at least one frequently co-occurring term (12) to the user. A system for analyzing reports comprises a co-occurrence statistics generator (26) for generating a plurality of co-occurrence statistics, a co-occurrence statistic being indicative of a first term, a first section, a second term, a second section, and a frequency in which reports contain the first term in the first section in combination with the second term in the second section.

20 Claims, 3 Drawing Sheets

(58) Field of Classification Search
CPC .... G06F 17/243; G06F 17/212; G06F 17/273; H04M 1/72552
USPC .................................................. 715/261, 224
See application file for complete search history.

(56) References Cited

U.S. PATENT DOCUMENTS

| | | | |
|---|---|---|---|
| 2005/0017954 A1* | 1/2005 | Kay ...................... | G06F 3/0233 345/169 |
| 2006/0167872 A1* | 7/2006 | Parikh ............................... | 707/6 |
| 2008/0195388 A1* | 8/2008 | Bower .................. | G06F 3/0237 704/243 |
| 2008/0294406 A1 | 11/2008 | Hachmeister | |
| 2009/0112832 A1* | 4/2009 | Kandogan et al. ............... | 707/4 |
| 2009/0249198 A1* | 10/2009 | Davis et al. .................. | 715/261 |
| 2010/0100568 A1* | 4/2010 | Papin .................... | G06F 17/276 707/794 |

OTHER PUBLICATIONS

Sinkkila, R. et al. "Combining Context Navigation with Semantic Autocompletion to Solve Problems in Concept Selection". SEMMA 2008 Workshop, 5th European Semantic Web Conference 2008 ESWC.

Jung, H. et al. "Auto-complete for Improving Reliability on Semantic Web Service Framework". Proceedings on the Symposium on Human Interface 2009 on Human Interface and the Management of Information. Information and Interaction, Part II: Held as part of HCI International 2009. pp. 36-44. ISBN: 978-3-642-02558-7.

Arias, M. et al., "Context Based Personalization for Mobile Web Search", VLDB '08, Aug. 24-30, 2008, Auckland, New Zealand.

K. Voll, "A hybrid approach to improving automatic speech recognition via NLP", Advances in Artificial Intelligence: Proceedings of 20th conference of the Canadian Society for Computational Studies of Intelligence (2007).

* cited by examiner

SUGGESTING RELEVANT TERMS DURING TEXT ENTRY

FIELD OF THE INVENTION

The invention relates to suggesting autocompletion terms during text entry of a report. The invention further relates to analyzing a plurality of reports.

BACKGROUND OF THE INVENTION

Clinical encounters, such as patient examinations, are often documented in the form of text reports. These reports can be dictated or typed by the clinician, for example a physician or nurse. An example of such a report is the radiology report, which typically contains some elements of patient history (clinical indication and/or reason for study), a description of the imaging procedure that was performed, and the outcome of the radiological investigation (findings and impression).

To speed up text entry, the next word or words may be predicted using autocompletion. This may be done by means of string pattern matching. When the beginning of a word is typed, the completion of that word may be suggested. To this end, an autocompletion algorithm may find one or more words in a dictionary which begin with the same characters as the characters which have just been typed. For example, entering in "pros" can match against strings such as "prostate" or "prostaglandin". More sophisticated algorithms can match against phrases: for example, "enlarged pros" will match against "enlarged prostate" but not "prostaglandin", since the first phrase statistically appears much more often. These matches are often presented to the user as a menu of possibilities, such that the correct possibility can be quickly chosen.

The paper entitled "Semantic autocompletion", by E. Hyvönen and E. Mäkalä, in Proceedings of the first Asia Semantic Web Conference (ASWC 2006), Beijing, Springer-Verlag, New York, Aug. 4-9, 2006, hereinafter: Hyvönen et al., discloses autocompletion based on matching input strings with a list of usable words in a vocabulary. The paper further discloses completing user written text not only into similar words, but into matching ontological concepts whose labels may not be related to the input on the literal level.

SUMMARY OF THE INVENTION

It would be advantageous to have improved autocompletion terms during text entry of a report. To better address this concern, a first aspect of the invention provides a system comprising a text entry unit for enabling a user to enter a text into a current report;

a section analyzer for determining a plurality of sections of the current report;

a current section detector for detecting a section of the current report which the user is working on, thus obtaining a current section;

a term extractor for extracting a term occurring in the current report, thus obtaining an extracted term, and identifying a section of the current report in which the extracted term occurs, thus obtaining an extracted term section, wherein the extracted term section and the current section are different sections;

a co-occurrence accessing unit for accessing a plurality of co-occurrence statistics, a co-occurrence statistic being indicative of at least one first term, at least one first section, a second term, a second section, and a frequency in which reports contain the at least one first term in the at least one first section in combination with the second term in the second section;

a term selector for selecting at least one frequently co-occurring term, based on the extracted term, the extracted term section, the current section, and at least one of the co-occurrence statistics; and an indicator for providing an indication of the at least one frequently co-occurring term to the user.

The frequently co-occurring term which is indicated to the user has a relatively high probability of being the word the user intended to enter into the report, because the selection of the term is based on a co-occurrence statistic which takes into account the section in which co-occurring terms usually occur. The co-occurrence statistic may be specific for a given domain context (e.g. radiology, cardiology, neurology). Compared to traditional string matching, an improvement is obtained by taking into account terms written in other sections of the report, which enables suggesting autocompletion terms which are more specific for the report which is being entered. This improvement is based on the insight that specific sections of the report may include specific kinds of information which may correlate differently with terms in the current section. As a particular example, a term occurring in the patient history section of a radiology report may correlate differently with terms in the diagnosis section than when the same term occurs in the findings section of the report.

In another aspect, the invention provides a system for analyzing a plurality of reports, comprising a section analyzer for determining a division of the reports into sections;

a common section determiner for determining a plurality of sections common to a plurality of the reports;

a term extractor for extracting a plurality of terms from the common sections of the reports, and associating each term with the section and report in which it occurs;

a co-occurrence statistics generator for generating a plurality of co-occurrence statistics, a co-occurrence statistic being indicative of at least one first term, at least one first section, a second term, a second section, and a frequency in which reports contain the at least one first term in the at least one first section in combination with the second term in the second section, wherein at least one first section is different from the second section.

This system generates co-occurrence statistics which may be used by the autocompletion system set forth. The co-occurrence statistics enable generating more useful autocompletion suggestions, because the co-occurrence statistics provide information about co-occurring terms which co-occur in specific, different sections of the reports. The system for analyzing a plurality of reports may be integrated with the system for suggesting autocompletion terms; alternatively, the systems may be implemented in different environments. When a co-occurrence statistic is indicative of a plurality of first terms and a plurality of first sections, at least one first section of the plurality of first sections is different from the second section.

A report may comprise a document, wherein a section comprises a section heading and a section body. The section heading allows detecting the existence of the section and this facilitates the systems set forth to extract the terms and associate extracted terms with the appropriate section.

Alternatively or additionally, a report may comprise a plurality of files, wherein different files comprise different sections of the report. This makes it easier to involve information from earlier dates or created by one or more different clinicians into the autocompletion process. This way, the user may be provided with more relevant autocompletion terms.

A report may comprise a digital form, wherein fields need to be filled in by the user. The information that is used to fill in some of the fields may come from different systems and can be stored as records in one or a plurality of databases.

A term may comprise a single word or a phrase composed of a plurality of words. For example, the extracted term and/or the first term may comprise an expression comprising a plurality of words. This allows improved suggestions, because the combination of a plurality of words for the extracted term and/or the first term may give rise to more specific co-occurrence statistics.

The system may comprise a natural language processor for associating the extracted term and/or the first term with an ontological concept in an ontology, and wherein the co-occurrence statistic relates to the probability of the co-occurrence of the ontological concept with the second term. This improves the accuracy of the co-occurrence statistics and/or the suggested terms.

The term selector may be operatively coupled to the text entry unit and arranged for receiving a portion of a term which is entered by the user, and arranged for selecting the frequently co-occurring term, based on the received portion of the term. This way, the suggested term is relevant for the word which has been partially entered by the user.

The term selector may be arranged for selecting a frequently co-occurring term of which the beginning matches the received portion of the term. This provides for a natural autocompletion process, in which the user enters the beginning of a term and is provided with complete terms matching the entered beginning The reports may include medical patient reports and the sections may include a patient history section, a clinical findings section, and/or a diagnosis section. This describes a typical medical reporting scenario.

In another aspect, the invention provides a workstation comprising one or more of the systems set forth.

In yet another aspect, the invention provides a method of suggesting autocompletion terms during text entry of a report, comprising
  enabling a user to enter a text into a current report;
  determining a plurality of sections of the current report;
  detecting a section of the current report which the user is working on, thus obtaining a current section;
  extracting a term occurring in the current report, thus obtaining an extracted term, and identifying a section of the current report in which the extracted term occurs, thus obtaining an extracted term section, wherein the extracted term section and the current section are different sections;
  accessing a plurality of co-occurrence statistics, a co-occurrence statistic being indicative of at least one first term, at least one first section, a second term, a second section, and a frequency in which reports contain the first term in the first section in combination with the second term in the second section;
  selecting at least one frequently co-occurring term, based on the extracted term, the extracted term section, the current section, and at least one of the co-occurrence statistics; and
  providing an indication of the at least one frequently co-occurring term to the user.

In another aspect, the invention provides a method of analyzing a plurality of reports, comprising
  determining a division of the reports into sections;
  determining a plurality of sections common to a plurality of the reports;
  extracting a plurality of terms from the common sections of the reports, and associating each term with the section and report in which it occurs; and
  generating a plurality of co-occurrence statistics, a co-occurrence statistic being indicative of at least one first term, at least one first section, a second term, a second section, and a frequency in which reports contain the first term in the first section in combination with the second term in the second section, wherein at least one first section is different from the second section.

In another aspect, the invention provides a computer program product comprising instructions for causing a processor system to perform one or more of the methods set forth herein.

It will be appreciated by those skilled in the art that two or more of the above-mentioned embodiments, implementations, and/or aspects of the invention may be combined in any way deemed useful.

Modifications and variations of the image acquisition apparatus, the workstation, the system, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In the following, embodiments will be described by means of examples.

For example, consider a clinical document that is being typed up as follows: "32 yo male presenting with tinnitus in left ear. MDCT shows mass impinging on left auditory canal." At the time the author has typed the "au" in "auditory canal", a string matching autocompletion may offer "au", "auditor", "auditory", "audition", "auditory", "auditory canal", "autosomal", etc. Using the techniques described herein, "auditory canal" would be promoted to the top of the list, because it has a relatively high co-occurrence frequency with "tinnitus".

As a second example, consider a radiology report on multiple sclerosis, containing the sentence: "No abnormality intensity observed in the white matter." Currently known methods may match the letter "w" in "white matter" with all words starting with the letter "w", or even all common radiological terms beginning with the letter "w". However, given the prior context, the list can be narrowed down and sorted in such a way that the most relevant terms go on top.

A sub-system may be arranged for analyzing previous reports and clinical documents, in order to "learn" and store the correlations between different terms. Another sub-system may be arranged for analyzing the currently entered report, so that new terms can be suggested based on (a) the current contents of the report as entered so far, and (b) the previously learned correlations between terms. Moreover, a sub-system may be arranged for displaying the suggested terms to the user.

Figure 1:
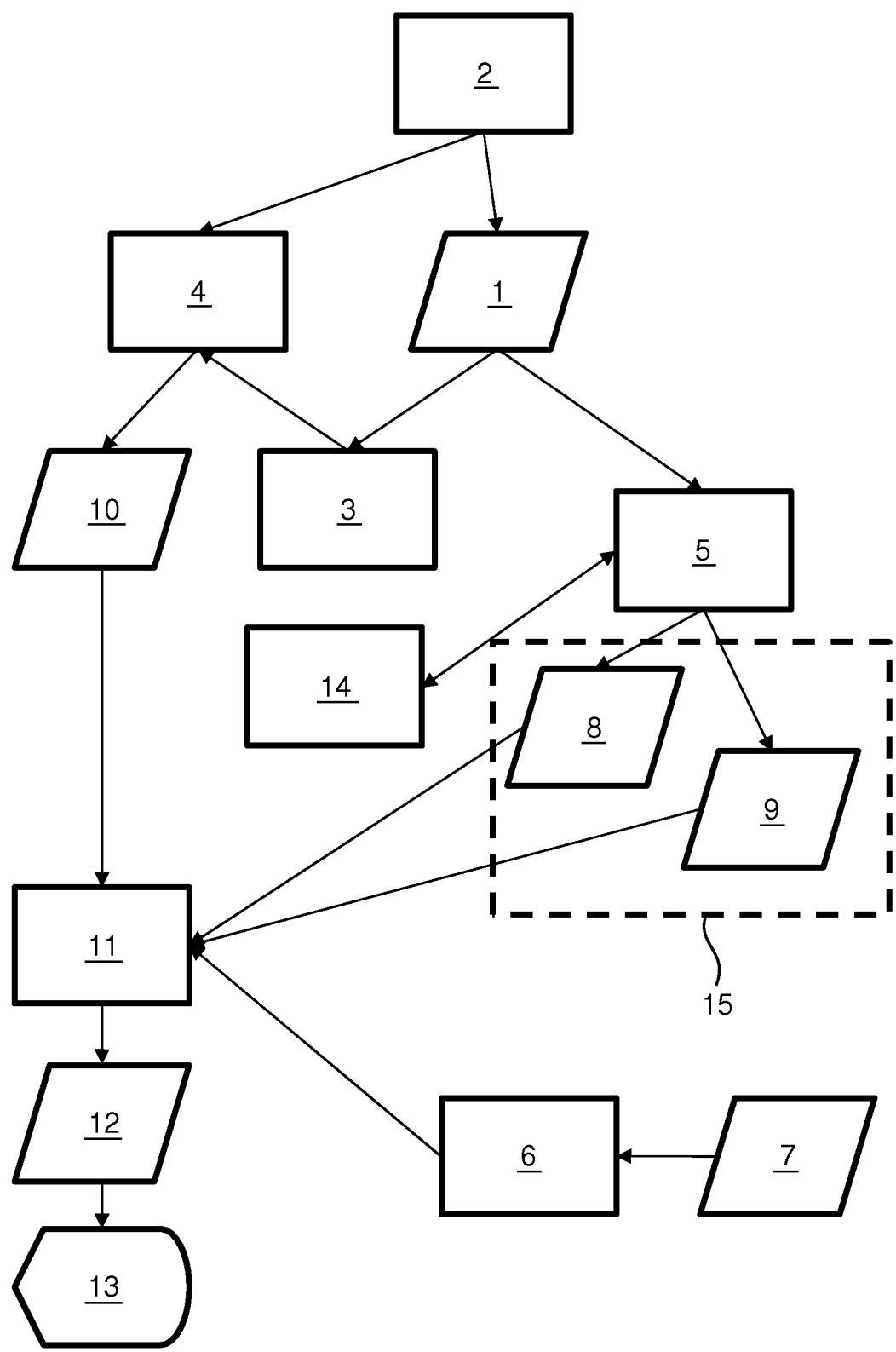
FIG. 1 is a block diagram of a system for suggesting autocompletion terms during text entry.

FIG. 1 illustrates a system for suggesting autocompletion terms. These autocompletion terms may be suggested during text entry of a report. The system may be implemented at least in part in a computer system. Such a system may comprise a workstation. Part of the system may be implemented on a server system accessed via a client system, wherein the client system may comprise a workstation. The system may comprise a display, a text entry device, such as a keyboard and/or a dictation input including real-time voice recognition software, a mouse for controlling the system, a communications port for communicating with a server and/ or for retrieving reports, statistics data, and/or for transmitting completed reports to a recipient. The system may comprise storage means for storing the reports and/or statistics data and other data.

The system may comprise a text entry unit 2 for enabling a user to enter a text into a current report 1. The text entry unit 2 may comprise a text editor, for example, or a word processor for enabling the user to author a text document, possibly leaving it up to the user to format the report and provide headings for sections according to the user's own insight. It is also possible that the text entry unit 2 shows a plurality of text input fields in which the user may type an appropriate text, wherein the text input fields may correspond to common sections of the report. When the report is completed, the text entry unit 2 may merge the fields into a single document or store the fields in a data record, for example in a patient electronic data record. The text entry unit 2 may be arranged for receiving an output of a voice recognition subsystem, enabling the user to input the report by verbally uttering the words of the text.

The system may comprise a section analyzer 3 for determining a plurality of sections of the current report. The section analyzer 3 may comprise a text parser for determining sections in the report. The section analyzer 3 may do this by detecting section headers and corresponding section bodies. Alternatively, the section analyzer 3 may use natural language processing to recognize different sections by analyzing the context of the text such as clinical history, examination, findings, based on the topics normally appearing in those sections. When the text entry unit 2 uses separate input fields for the sections, the section analyzer 3 may at least to some extent be integrated in the text entry unit, because the sections are determined by the input fields.

The system may comprise a current section detector 4 for detecting a section of the current report which the user is working on. This section is referred to herein as the current section 10. To this end, the current section detector 4 may be operatively coupled to the text entry unit 2 and the section analyzer 3. The current section detector 4 may use a cursor position, for example, or the location where the last word or character was added, as the current section 10.

The system may comprise a term extractor 5 for extracting a term occurring in the current report, thus obtaining an extracted term 8. The term extractor 5 uses the detected sections to determine in which section of the current report the extracted term occurs, thus obtaining an extracted term section 9. The extracted term 8 and the extracted term section 9 may be regarded as an extracted pair 15. The term extractor 5 may process all or at least part of the current report 1 to extract the words occurring therein, and associate those words with the corresponding sections. One or more of the extracted terms may occur in an extracted term section 9 which is different from the current section 10.

The system may comprise a co-occurrence accessing unit 6 for accessing a plurality of co-occurrence statistics 7. To this end, the co-occurrence accessing unit 6 may provide an interface to e.g. a database or storage area. The co-occurrence statistics provide information about terms which frequently co-occur in the reports in a particular knowledge domain. This way, the extracted term 8 and extracted term section 9 may be matched with the terms and sections for which there are co-occurrence statistics, and those co-occurrence statistics may provide information about possible words which the user intends to enter. The co-occurrence statistic may be indicative of a first term, a first section, a second term, a second section, and a frequency in which reports contain the first term in the first section in combination with the second term in the second section. For some of the co-occurrence statistics, the first section may be different from the second section, whereas for some other co-occurrence statistics, the first section may be the same as the second section. A co-occurrence statistic may also relate to more than two words distributed over one, two, or more sections. For example, a co-occurrence statistic may be indicative of a plurality of pairs, each pair comprising a term and a corresponding section in which the term occurs, and a co-occurrence frequency of the terms and sections, which indicates how often a report contains all the terms in the sections as indicated by the plurality of pairs.

The system may comprise a term selector 11 for selecting at least one frequently co-occurring term 12. To this end, the term selector 11 may receive information about the extracted terms 8, the extracted term sections 9, the current section 10, and at least one of the co-occurrence statistics 7. The term selector 11 may be arranged for specifically taking into account one or more extracted terms 8 extracted from an extracted term section 9 of the report which is different from the current section 10. For example, the term selector 11 may be arranged for receiving from the co-occurrence accessing unit 6 all co-occurrence statistics for the extracted terms 8 extracted by the term extractor 5. Also, the term selector 11 may be arranged for receiving from the co-occurrence accessing unit 6 all co-occurrence statistics indicative of a plurality of first terms and first term sections, wherein the first terms and first term sections of those received co-occurrence statistics each match the extracted pairs 15 of extracted terms 8 and extracted term sections 9. After that, the term selector 11 may sort the received co-occurrence statistics by frequency of co-occurrence, such that the most frequently co-occurring terms are at the top of a list. The list may be limited to contain only the most frequently co-occurring terms. The received co-occurrence statistics may also be sorted by the number of first terms, to give preference to more specific, suggested terms, which frequently co-occur with a relatively large number of extracted terms appearing in the current report. The list may be shown to a user. To this end, the system may comprise an indicator 13 for providing an indication of the at least one frequently co-occurring term 12 to the user. The user may select a term from the list, using a user interface element, and the text entry unit 2 may be arranged for inserting the selected term into the current section. When the report is completed, the system may be configured or the user may be enabled to store or transmit the report as desired.

Figure 2:
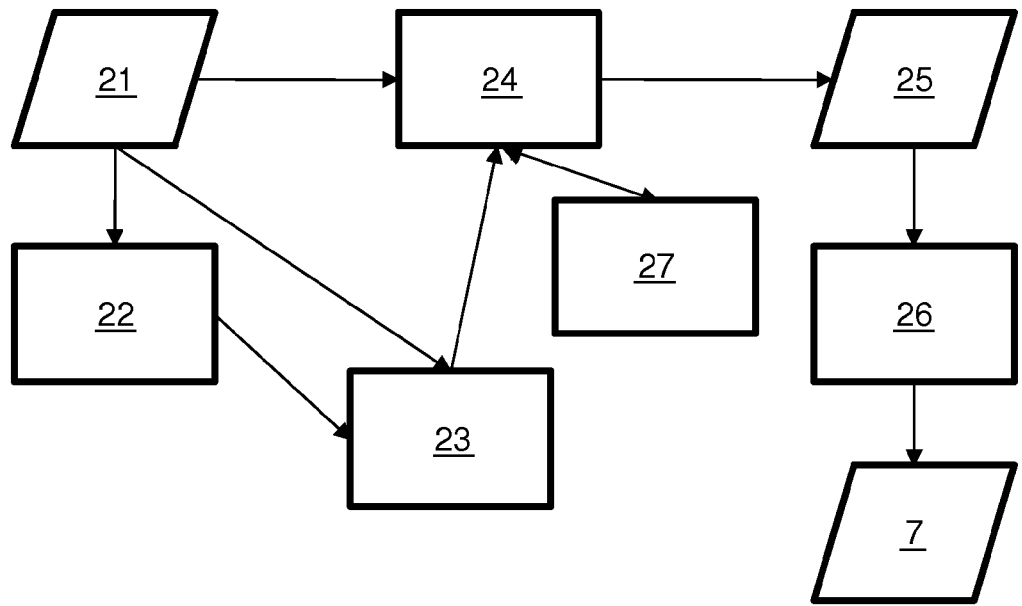
FIG. 2 is a block diagram of a system for analyzing reports.

FIG. 2 shows a block diagram of a system for analyzing reports. The system may be implemented on a similar kind of hardware as the system for suggesting autocompletion terms. The plurality of co-occurrence statistics 7 is indicated with the same reference numeral as in FIG. 1, as it refers to the same or a similar data structure. The system for analyzing reports has access to a plurality or collection of reports 21. This collection of reports 21 may be organized in a database or as a simple collection of documents stored in a file structure.

The system for analyzing reports may comprise a section analyzer 22 for determining a division of a plurality of reports 21 into sections. To this end, the section analyzer 22 may be arranged for processing the reports one-by-one, or in parallel, and detecting section headers and section bodies of each processed report. Other ways to detect the sections are described above in respect of the section analyzer 3 of the system for suggesting autocompletion terms.

The system for analyzing reports may comprise a common section determiner 23 for determining a plurality of sections common to a plurality of the reports 21. This way, a plurality of common sections is obtained. The common section determiner 23 may be arranged for comparing the section headers of the sections of different reports, and when a large enough number of reports have the same section header or a similar section header, the section may be labeled with a section identifier and marked as a common section.

The system for analyzing reports may comprise a term extractor 24 for extracting a plurality of terms 25 from the common sections of the reports, and associating each term with the section and report in which it occurs. The term extractor 24 may be similar to the term extractor 5 of the system for suggesting autocompletion terms, however the term extractor 24 is arranged for processing a number of completed reports rather than reports which are in the process of begin created.

The system for analyzing reports may comprise a co-occurrence statistics generator 26 for generating a plurality of co-occurrence statistics 7. Such a co-occurrence statistic may be indicative of a first term, a first section, a second term, a second section, and a frequency in which reports contain the first term in the first section in combination with the second term in the second section. The co-occurrence statistics generator 26 may combine terms extracted from different sections to obtain a co-occurrence statistic that relates to co-occurrence of terms in different sections, and thus the first section of a co-occurrence statistic may be different from the second section. The plurality of co-occurrence statistics may further comprise co-occurrence statistics that relate to co-occurrence of terms within the same section, in which case the first section and the second section are the same. The generated plurality of co-occurrence statistics may be used by the system for suggesting autocompletion terms as described in respect of FIG. 1.

The system for analyzing reports and the system for suggesting autocompletion terms may be integrated in a single system which is capable of generating the co-occurrence statistics based on a plurality of reports and suggesting autocompletion terms during creation of a new report. However, it is also possible that the two systems are implemented as separate entities, such that a product developer or a technician may use the system for analyzing reports to prepare a set of co-occurrence statistics 7, which may be used by a large number of users as input to the system for suggesting autocompletion terms. The following features may be applied to both the autocompletion system and the report analyzing system.

The reports may be provided in many different formats, without substantially affecting the working of the systems. For example, a report may have the format of a document, such as a plain text document or a formatted text document. The report may also have the format of an XML document. The XML codes of such XML documents may be used to encode a variety of things; for example, the XML codes may be used to indicate sections. A section of a document may be built up of a section heading and a section body. For example, a blank line is followed by a line which is the section heading, and the section heading is followed by a blank line and the section body. In formatted text documents or XML documents, the location of a heading and/or a section may be indicated by means of metadata. The section analyzer 3, 22 may contain a parser for retrieving any such information about sections.

A report 1, 21 may comprise a plurality of files. For example, different files comprise different sections of the report. This makes it easy to identify the different sections.

The extracted term 8, extracted by the term extractor 5, and/or the first term used by the co-occurrence generator 26 or in a co-occurrence statistic may comprise a plurality of words, for example an expression or phrase comprising a sequence of words. This expression may for example comprise an adjective followed by a noun. It is also possible that the plurality of words are not a fixed sequential expression, but a plurality of words which may occur anywhere in a particular section. When each of this plurality of words occurs in that section, the co-occurrence statistic indicates frequency of co-occurrence with a second term. However, it is also possible to configure the system such that each co-occurrence statistic only relates to one first term (which may be an expression of a sequence of words), and that for different words occurring throughout a section, independent co-occurrence statistics are generated. The term selector may combine multiple information from relevant co-occurrence statistics to improve the selection of the frequently co-occurring term 12.

The systems may comprise a natural language processor 14, 27. The natural language processor 14, 27 may be arranged for associating the extracted term 8 and/or the first term with an ontological concept in an ontology. This can be done using techniques known in the art of natural language processing per se. An ontology can be used that is relevant to the knowledge domain of the plurality of reports 21. Accordingly, the co-occurrence statistic may relate to the probability of the co-occurrence of the ontological concept with the second term. The second term may also correspond to an ontological concept.

The term selector 11 may be operatively coupled to the text entry unit 2 and arranged for receiving a portion of a term which is entered by the user, and arranged for selecting the frequently co-occurring term 12, based on the received portion of the term. This way, the suggested terms can be more relevant as they correspond to the portion of the term which the user has entered. For example, the term selector 11 is arranged for selecting at least one frequently co-occurring term 12 of which the beginning matches the received portion of the term. However, this is not a limitation. The term selector 11 could select any term having the typed-in portion as a substring of the term.

The reports 1, 21 may include medical patient reports and the sections include a patient history section, a clinical findings section, and/or a diagnosis section. However, the systems may also be used for other knowledge domains.

Figure 3:
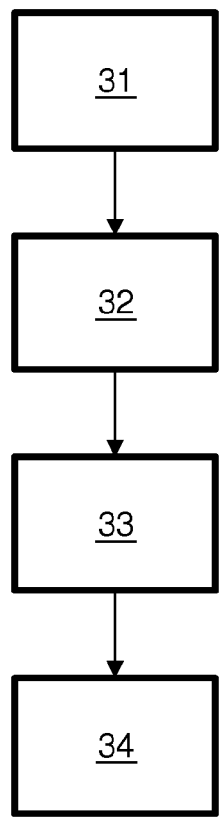
FIG. 3 is a flowchart of a method of analyzing reports.

FIG. 3 shows a flowchart of a method of analyzing a plurality of reports. The method may comprise a step 31 of determining a division of the reports into sections. The method may comprise a step 32 of determining a plurality of sections common to a plurality of the reports. The method may comprise a step 33 of extracting a plurality of terms from the common sections of the reports, and associating each term with the section and report in which it occurs. The method may comprise a step 34 of generating a plurality of co-occurrence statistics, a co-occurrence statistic being indicative of a first term, a first section, a second term, a second section, and a frequency in which reports contain the first term in the first section in combination with the second term in the second section. The method may comprise further steps or be subject to modifications, as will be apparent to the skilled person in view of the present description, including the description of the systems.

Figure 4:
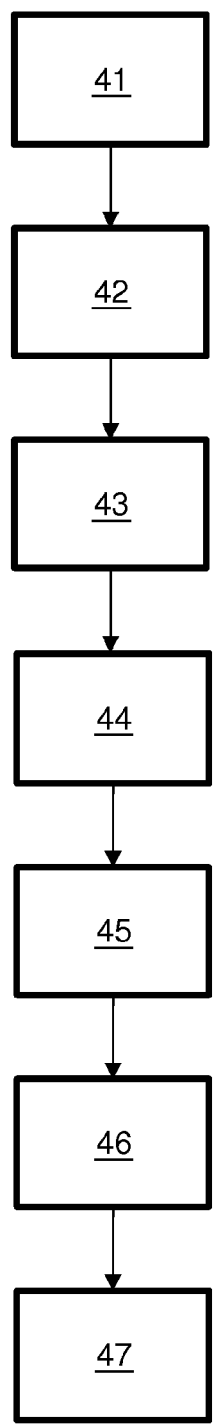
FIG. 4 is a flowchart of a method of suggesting autocompletion terms during text entry.

FIG. 4 shows a flowchart of a method of suggesting autocompletion terms during text entry of a report. The method may comprise a step 41 of enabling a user to enter a text into a current report. The method may comprise a step 42 of determining a plurality of sections of the current report. The method may comprise a step 43 of detecting a section of the current report which the user is working on, thus obtaining a current section. The method may comprise a step 44 of extracting a term occurring in the current report, thus obtaining an extracted term, and identifying a section of the current report in which the extracted term occurs, thus obtaining an extracted term section, wherein the extracted term section and the current section are different sections. The method may comprise a step 45 of accessing a plurality of co-occurrence statistics, a co-occurrence statistic being indicative of a first term, a first section, a second term, a second section, and a frequency in which reports contain the first term in the first section in combination with the second term in the second section. The method may comprise a step 46 of selecting at least one frequently co-occurring term, based on the extracted term, the extracted term section, the current section, and at least one of the co-occurrence statistics. The method may comprise a step 47 of providing an indication of the at least one frequently co-occurring term to the user. The method may comprise further steps or be subject to modifications, as will be apparent to the skilled person in view of the present description, including the description of the systems.

The methods and systems described herein may also be implemented in software as a computer program product. In practice, the methods and systems may be implemented using one or more computer systems. One system may analyze reports stored in, for example, a hospital radiology information system (RIS). The extracted correlations between terms are stored for later use. As a new report is being typed or dictated, the report is continuously analyzed by a computer system, in conjunction with the extracted correlations. The on-line analysis is used to suggest potentially appropriate terms which are then displayed on a computer screen, based on the combined analysis of the previous reports and the current reports.

Natural language processing (NLP), known in the art per se, can be used to extract relevant terms or concepts from free-text clinical documents and identify their context within the document. These can be stored in a database or other structured format (e.g. XML). As an example, consider a report section:

"HISTORY: 45 year old female presenting with tinnitus in left-ear and tingling in hands."

NLP methods may be used to convert this into a format, describing the contents (such as demographics, findings, problems), detailed information (such as body locations, sex, age), alphanumeric codes to uniquely identify the concepts (such as UMLS codes), and the section of the report (such as "past history"). For example, the report section recited above may be converted into the following:

```
finding:demographics
    age>> [45,[idref,4],year,[idref,6]]
    sectname>> report past history item
    sex>> female
problem:tinnitus
    bodyloc>> ear
    region>> left
    code>> UMLS:C0521421_Entire ear
    sectname>> report past history item
    code>> UMLS:C0040264_Tinnitus
problem:tingling
    bodyloc>> hand
    code>> UMLS:C0018563_Hand
    certainty>> high certainty
    sectname>> report past history item
    code>> UMLS:C0423572_Pins and needles
```

This process may be performed on a large set of reports. This step may be performed on all text data contained in a radiology information system (RIS), laboratory information system (LIS), or hospital information system (HIS). It is possible to restrict the set of reports being analyzed to those reports authored by a particular set of authors, such as medical professionals. This set of authors may be a single individual, thus personalizing the suggestion system. The set of authors may also be selected in order to obtain suggestions that are valid for a relevant knowledge domain. To this end, the set of authors may comprise a set of senior physicians, a department within a hospital, a section within a department, or across multiple hospitals.

The structured data elements extracted from each report can be stored in a database. In a simple embodiment, the database comprises a list of report identifiers and terms. Moreover, the section in which the term was found may be stored in the database. In an example, we may have the following simplified database:

| reportID | term | section |
| --- | --- | --- |
| 1 | tinnitus | history |
| 1 | tingling | history |
| 1 | auditory canal | findings |
| 2 | multiple sclerosis | history |
| 2 | white matter | findings |
| 3 | tinnitus | history |
| 3 | glioblastoma | findings |
| 3 | auditory canal | findings |

To improve the system, a larger database may be created based on more different reports and involving more terms. However, using the above database to explain the system, it may be inferred that there is a correlation between, for example, "tinnitus" and "auditory canal". If a large enough database is constructed, many more relationships could be inferred.

The correlation of terms may be explicitly stored. This list of correlations can be filtered and sorted, based on quantitative measures: number of reports with the co-occurrence, a statistical p-value, for example computed through a chisquared test or Fisher exact test, or the Bayesian probability P(term X|term A, term B, . . . , term N) (to be interpreted as the probability that a specific term X appears, given that we have already seen term A, B, . . . , N in (particular sections of) the report). In comparison, it is noted that "A hybrid approach to improving automatic speech recognition via NLP", by K. Voll, in: Advances in artificial intelligence: Proceedings of 20th Conference of the Canadian Society for Computational Studies of Intelligence, Canadian AI 2007, Montreal, Canada, 2007, discloses a method of post-automatic speech recognition error detection. The paper discloses a heuristic based on co-occurrence relations in a context window which is defined as the n words occurring to either side of a word. These co-occurrence relations may be conditional probabilities, using Bayes' Theorem.

As a new report is being entered (typically by typing or dictation), the system described in this description may process it. The same or similar methods of natural language processing may be used, as described above. Again, the terms and concepts in the report may be extracted and structured. This analysis may be performed continuously, as new words are dictated or new letters are typed. In typed reports, as each letter is entered, the prediction step described here may be activated to suggest terms that may complete the entered word or phrase. In the case of dictation, a word may be ambiguously entered due to limitations of known speech recognition algorithms. For example, known speech recognition methods may not be able to separate with certainty the spoken words "creatinine" and "creatine". In these cases, the prediction step described here may be activated.

The system may look up matching words in a list of medical terms. Thus, if the letter "a" is entered, all medical terms beginning with the letter "a" are identified. After that, the extracted information from the current report and the stored analyses from historical (past) reports may be combined to prioritize certain terms. For example, the database may be searched, seeking all past reports that contain the same terms or ontological concepts as the ones extracted from the current report. This way, terms frequently co-occurring with those terms may be found and prioritized based on frequency of co-occurrence.

As an example, consider a new report being typed, wherein the history section contains the term "tinnitus". In this example, the currently typed word begins with the letter "a". Using known methods, the possible list of words may be restricted to those beginning with "a". Next, in comparison with the small example database given in Step 2, it is found that "tinnitus" co-occurs often with the term "auditory canal". This term can then be promoted to the top of the list of possibilities and indicated to the user as a suggestion to autocomplete the term being typed.

The comparison may be performed in the context of the report sections. When processing historical data to find co-occurrences, the processing may take into account the sections in which terms appear. For example, if the current report shows "glioblastoma" in the history section, then the system may be arranged for only taking into account previous reports in which "glioblastoma" is in the history section. Similarly, depending on in which section the current word is typed, only terms found in the same section in prior reports are suggested.

The results can be shown as an on-screen menu listing the possible matches in order of priority. This priority may be based on a co-occurrence frequency of the suggested word in view of the extracted terms and concepts and sections thereof. The suggested terms can be presented separately for different types of terms, such as terms relating to diseases, symptoms, findings, and procedures.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware.

The mere fact that certain measures are recited in mutually different dependent claims does not indicate that a combination of these measures cannot be used to advantage.

The invention claimed is:

1. A system for suggesting autocompletion terms during text entry of a report, comprising
 a word processor configured for:
  enabling a user to enter a text into a current report;
  determining a plurality of sections of the current report;
 one or more computer processors configured for:
  detecting sections of the plurality of sections of the current report which the user is working on, thus obtaining a current section;
  extracting a term occurring in the current report, thus obtaining an extracted term,
  identifying sections of the plurality of sections of the current report in which the extracted term occurs, thus obtaining an extracted term section, wherein the extracted term section and the current section are different sections;
  accessing a plurality of co-occurrence statistics, a co-occurrence statistic being indicative of at least one first term, at least one first section which contains the first term, a second term, a second section which contains the second term, and a frequency in which reports in a knowledge domain contain the at least one first term in the at least one first section in combination with the second term in the second section, wherein the at least one first section is different from the second section;
  selecting at least one frequently co-occurring term, based on the extracted term, the extracted term section which contains the extracted term, the current section, and the co-occurrence statistics, wherein the at least one frequently co-occurring term is selected for a portion of a term entered in the current section based on at least one of the co-occurrence statistics associated with the extracted term in the extracted term section;
 the word processor further being configured for providing an indication of the at least one frequently co-occuring term to the user.

2. The system according to claim 1, wherein a report comprises a document and wherein a section comprises a section heading and a section body.

3. The system according to claim 1, wherein the report comprises a plurality of files, and wherein different files comprise different sections of the report.

4. The system according o claim 1, wherein the extracted term and/or the first term comprise an expression comprising a plurality of words.

5. The system according to claim 1, wherein the one or more computer processors are further configured for:
 associating the extracted term and/or the at least one first term with at least one respective ontological concept in an ontology, and wherein the co-occurrence statistic relates to the probability of the co-occurrence of the at least one ontological concept with the second term.

6. The system according to claim 1, wherein the one or more computer processors are further configured for:
 receiving a portion of the term occurring in the report, and selecting the frequently co-occurring term, based on the received portion of the term.

7. The system according to claim 6, wherein the one or more computer processors are further configured for:
 selecting at least one frequently co-occurring term of which the beginning matches the received portion of the term.

8. The system according to claim 1, wherein the reports include medical patient reports and the sections include a patient history section, a clinical findings section, and/or a diagnosis section.

9. A workstation comprising the system according to claim 1.

10. A system for analyzing reports, comprising:
 a means for enabling a user to input content into a current medical patient report; one or more processors configured to:
  determine a division of a plurality of medical patient reports into sections,
  determine a plurality of common sections of the plurality of the medical patient reports including a patient history section, a clinical finding section, and a diagnosis section common to the plurality of the medical patient reports,
  extract a plurality of terms from the common sections of the plurality of the medical patient reports, and associate each term with the section and report in which it occurs,
  generate a plurality of co-occurrence statistics, the co-occurrence statistic being indicative of at least one first term, at least one first section of the plurality of sections, a second term, a second section of the plurality of sections, and a frequency in which the medical patient reports contain the at least one first term in the at least one first section in combination with the second term in the second section, wherein the at least one first section is different from the second section,
  select suggested autocompletion terms based on the generated plurality of co-occurrence statistics and the input content into the current medical patient report; and
 a display configured to display the current medical patient report and the suggested autocompletion terms for the current medical patient report.

11. The system according to claim 10, wherein the input content includes text.

12. A method of suggesting autocompletion terms during text entry of a report, comprising:
 enabling a user to enter a text into a current report;
 determining a plurality of sections of the current report;
 detecting a section of the current report which the user is working on, thus obtaining a current section;
 extracting a term occurring in the current report, thus obtaining an extracted term, and identifying a section of the current report in which the extracted term occurs, thus obtaining an extracted term section, wherein the extracted term section and the current section are different sections;
 accessing a plurality of co-occurrence statistics, a co-occurrence statistic being indicative of at least one first term, at least one first section, a second term, a second section, and a frequency in which reports in a knowledge domain contain the at least one first term in the at least one first section in combination with the second term in the second section wherein the at least one first section is different from the second section;
 selecting at least one frequently co-occurring term, based on the extracted term, the extracted term section, the current section, and at least one of the co-occurrence statistics, wherein the selection of the at least one frequently co-occurring term for a portion of a term entered in the current section is based on at least one of the co-occurrence statistics associated with the extracted term in the extracted term section; and providing an indication of the at least one frequently co-occurring term to the user.

13. A non-transitory computer-readable medium carrying instructions for causing a processor system to perform the method according to claim 12.

14. A system for suggesting autocompletion terms during text entry of a report, comprising:
a text entry device configured to enable a user to enter text into a current report;
one or more processors configured to:
  determine a plurality of sections of the current report,
  detect a section of the current report which the user is working on, thus detecting a current section,
  extract a term occurring in the current report, thus extracting an extracted term,
  identify a section of the current report in which the extracted term occurs, thus identifying an extracted terns section, wherein the extracted term section and the current section are different sections,
  access a plurality of co-occurrence statistics, the co-occurrence statistics being indicative of at least one first. term, at least one first section, a second term, a second section, and a frequency in which prior reports contain the at least one first term in the at least one first section in combination with the second term in the second section, wherein the at least one first section is different from the second section,
  select at least one frequently co-occurring term, based on the extracted term, the extracted term section, the current section, and at least one of the co-occurrence statistics, wherein the at least one frequently co-occurring term for a portion of a term entered in the current section is selected based on at least one of the co-occurrence statistics associated with the extracted term in the extracted term section; and a display device configured to display an indication of the at least. one frequently co-occurring term to the user.

15. The system according to claim 14, wherein the report comprises a document and wherein the sections comprise section headings and section bodies.

16. The system according to claim 14, wherein the report comprises a plurality of files, and wherein different files comprise different sections of the report.

17. The system according to claim 14, wherein the extracted term and/or the first term comprise an expression comprising a plurality of words.

18. The system according to claim 14, wherein the one or more processors are further configured to:
associate the extracted term and/or the at least one first term with at least one respective ontological concept in an ontology, and wherein the co-occurrence statistics relate to a probability of a co-occurrence of the at least one ontological concept with the second term.

19. The system according to claim 14, wherein the one or more processors are further configured to:
receive a portion of a term which is entered by the user;
select the frequently co-occurring term, based on the received portion of the term; and
select at least one frequently co-occurring term of which the beginning matches the received portion of the term.

20. The system according to claim 14, wherein the reports include medical patient reports and the sections include a patient history section, a clinical findings section, and/or a diagnosis section.

* * * * *